US005141250A

United States Patent [19]

Morgan et al.

[11] Patent Number: 5,141,250

[45] Date of Patent: Aug. 25, 1992

[54] LIGHTWEIGHT TRANSPORTABLE WHEELCHAIR

[76] Inventors: Jerry E. Morgan, 352 67th St., Clarendon Hills, Ill. 60514; David E. Morgan, 9 South 502 Dix on Ct., Downers Grove, Ill. 60516

[21] Appl. No.: 622,488

[22] Filed: Dec. 5, 1990

[51] Int. Cl.[5] .............................................. B62M 1/14

[52] U.S. Cl. .................................. 280/250.1; 280/42; 280/650; 297/45; 297/DIG. 4

[58] Field of Search ..................... 297/44, 45, DIG. 4; 280/250.1, 39, 42, 647, 650, 304.1, 47.38, 47.4

[56] References Cited

U.S. PATENT DOCUMENTS 4,270,795 6/1981 Warren ................................ 297/45
4,320,818 3/1982 Knoche ....................... 280/250.1 X
4,371,183 2/1983 Dion .......................... 280/250.1 X
4,566,731 1/1986 Marchesini .......................... 297/45

*Primary Examiner*—Andres Kashnikow
*Assistant Examiner*—Michael Mar
*Attorney, Agent, or Firm*—Augustus G. Douvas

[57] ABSTRACT

A lightweight, easily transportable wheelchair having seat-support frame members which are adjustably coupled to back-frame members so as to reciprocate up-and-down within guide slots formed in the back-frame members. Additionally, the front and back wheels, the armrests, and the footrests are readily detachable and attachable. This arrangement reduces the overall height, width and depth of the basic frame of the wheelchair to make for easy transportability when the detachable parts are removed.

8 Claims, 9 Drawing Sheets

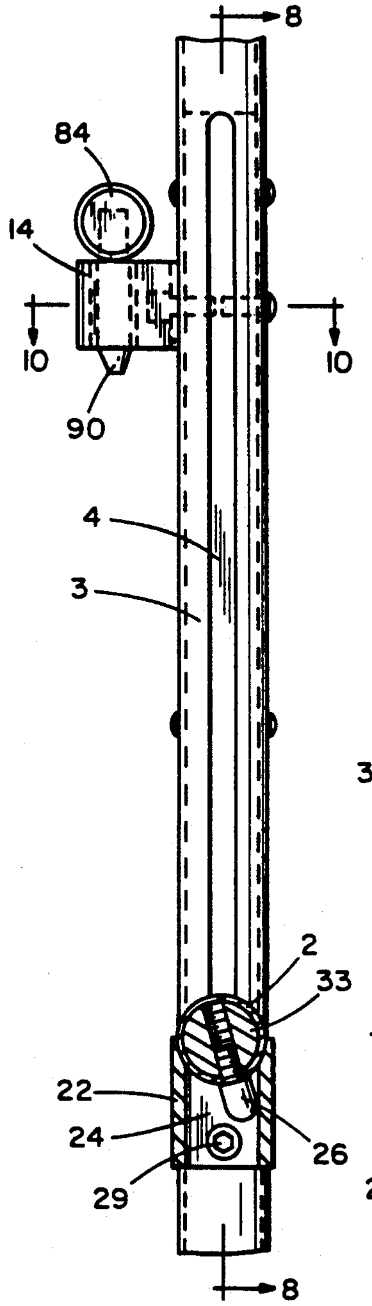
FIG. 7
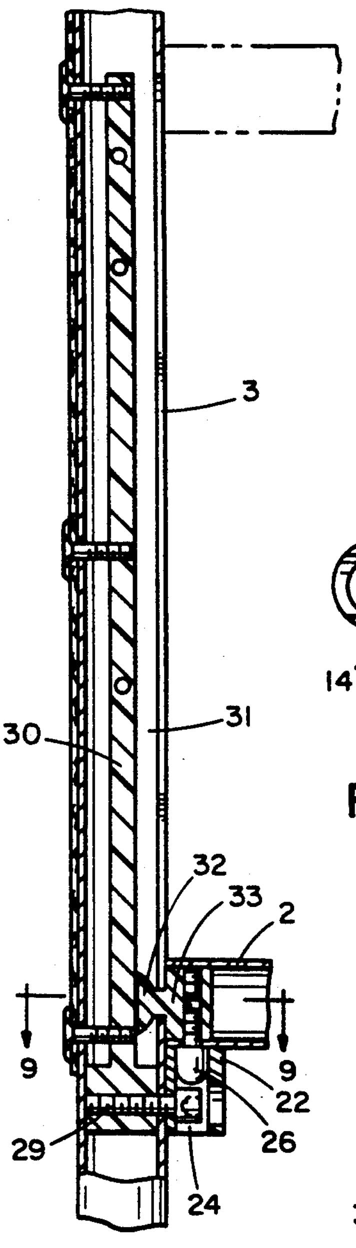
FIG. 8
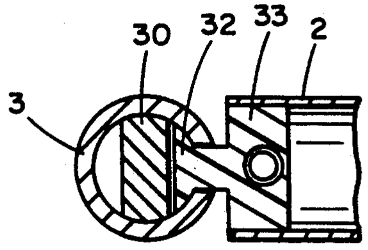
FIG. 9
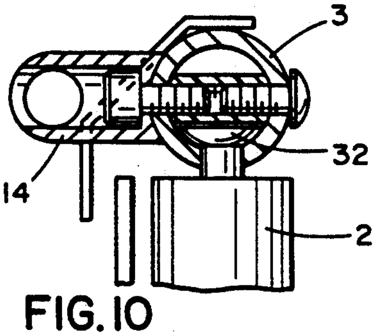
FIG. 10
FIG. 30
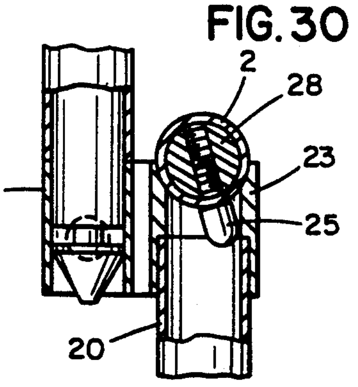
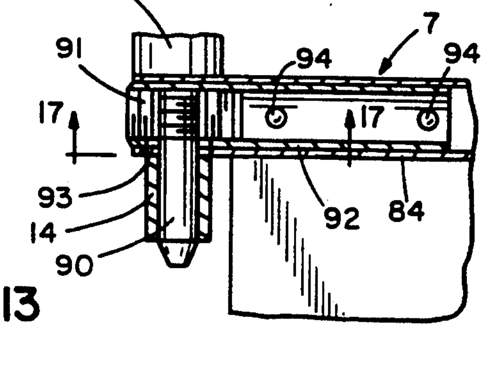
FIG. 13

LIGHTWEIGHT TRANSPORTABLE WHEELCHAIR

This invention relates to a lightweight, easily transportable wheelchair for the disabled.

BACKGROUND OF THE INVENTION

The daily activities of handicapped individuals who require the use of wheelchairs are often restricted by unwieldly wheelchairs. These wheelchairs are usually heavy in weight, large in size when folded for transport, and the wheels, footrests and armrests are either fixed to the wheelchair or are detachable and also attachable to the wheelchair with great difficulty.

Heavy wheelchairs require additional energy to move and lift which is unnecessarily tiring. Large wheelchairs which cannot be folded or partially disassembled must be transported in vans and buses rather than in the trunk or passenger compartment of small passenger vehicles.

In many instances lifting an occupant from a wheelchair is facilitated by the prior removal of one or more footrests and armrests. The removed members must ultimately by reapplied to the wheelchair. Accordingly, any difficulty in taking these steps reduces the utility of the wheelchair.

STATEMENT OF THE INVENTION

Accordingly, a principal object of this invention is to provide a lightweight wheelchair which is easily moved, lifted, transported and stored.

Another object of the invention is to provide a wheelchair in which all wheels, footrests and armrests are both attachable and detachable from the wheelchair with ease.

Another object of the invention is to provide a wheelchair with a relatively small storage profile whether or not the wheels, footrests and armrests are attached or detached.

Another object is to provide a wheelchair having a simplified frame construction in order to reduce weight but which is both durable and rigidly strong.

Another object is to provide an improved wheelchair frame, back and seat assembly for both folding and unfolding a wheelchair.

Another object is to provide an easily manipulatable and simple footrest interlock for a wheelchair in the unfolded condition.

Another object is to provide an easily adjustable structure for lengthening or shortening a footrest for the comfort of the occupant.

Another object is to provide an easily adjustable structure for aligning the frame coupling elements of a wheelchair armrest with their mating supporting elements located on a wheelchair frame.

Another object is to provide an improved wheelchair subassembly for attaching and detaching both the front caster wheels and the footrests of a wheelchair.

Another object is to provide an improved rear-wheel hub and axle subassembly for both attaching and detaching both rear wheels from a wheelchair.

The structural features for attaining the foregoing objects of this invention are summarized in a following section of this specification captioned "Brief Description of the Structural Features", and described in length in a later section entitled "Detailed Description of the Preferred Embodiment".

BRIEF DESCRIPTION OF THE DRAWINGS

In order that all of the structural features for attaining the objects of this invention may be readily understood, reference is now made to the accompanying drawings in which:

FIG. 7 is a section view taken along line 7—7 of FIG. 4 which shows a portion of the right back-frame member, the right rear armrest support, and the right seat-support saddle;

FIG. 8 is a section view taken along line 8—8 of FIG. 7 which shows the structure for adjustably coupling the right back-frame member to the right seat-support frame member;

FIG. 9 is a section view taken along line 9—9 of FIG. 8 which shows the rear guide for the right seat-support frame member coupled to the right back-frame member;

FIG. 10 is a fragmentary view partly in section which shows additional details of the rear guide plug and the right back-frame liner of FIG. 9 and also the rear armrest support;

FIG. 13 is a section view taken along line 13—13 of FIG. 6 which shows a detail of the armrest rear guide pin and its alignment adjustment structure;

FIG. 30 is a fragmentary section view taken along line 30—30 of FIG. 4 which shows the right armrest and the right seat-support frame member in their seated position on the armrest support and seat saddle.

BRIEF DESCRIPTION OF THE STRUCTURAL FEATURES

Figure 1:
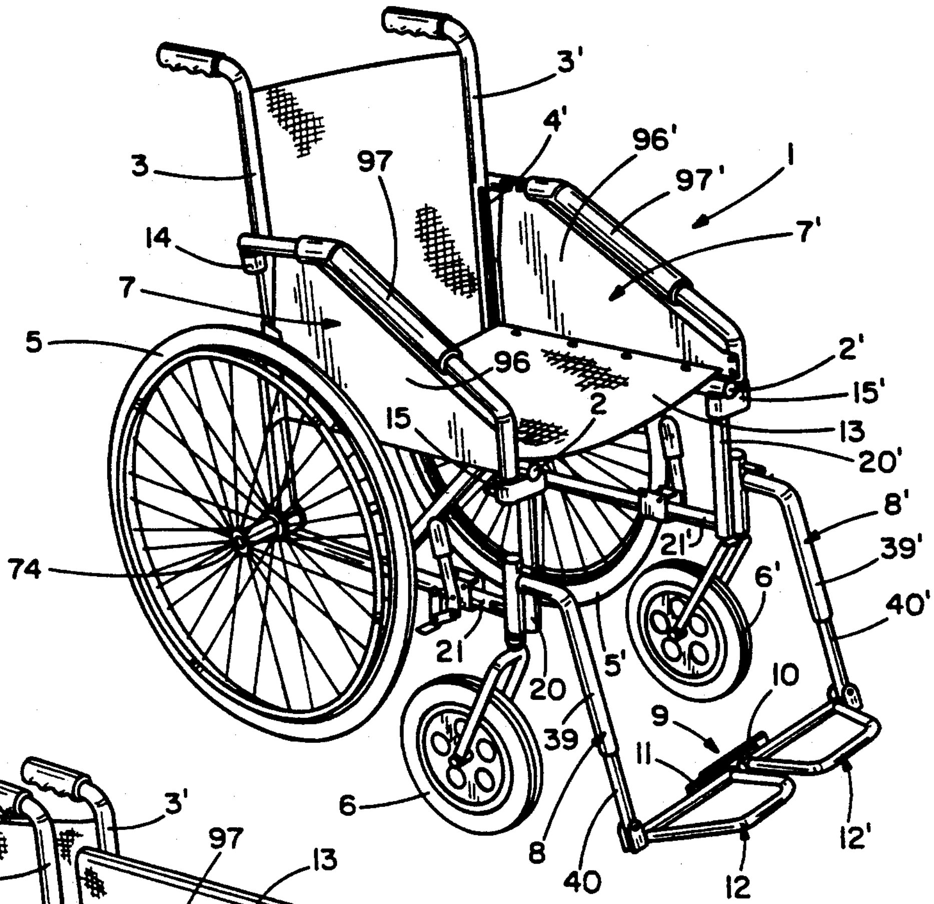
FIG. 1 is a perspective view of a preferred embodiment of the light .weight, easily-transportable wheelchair of this invention in an unfolded condition ready for occupancy.
Figure 2:
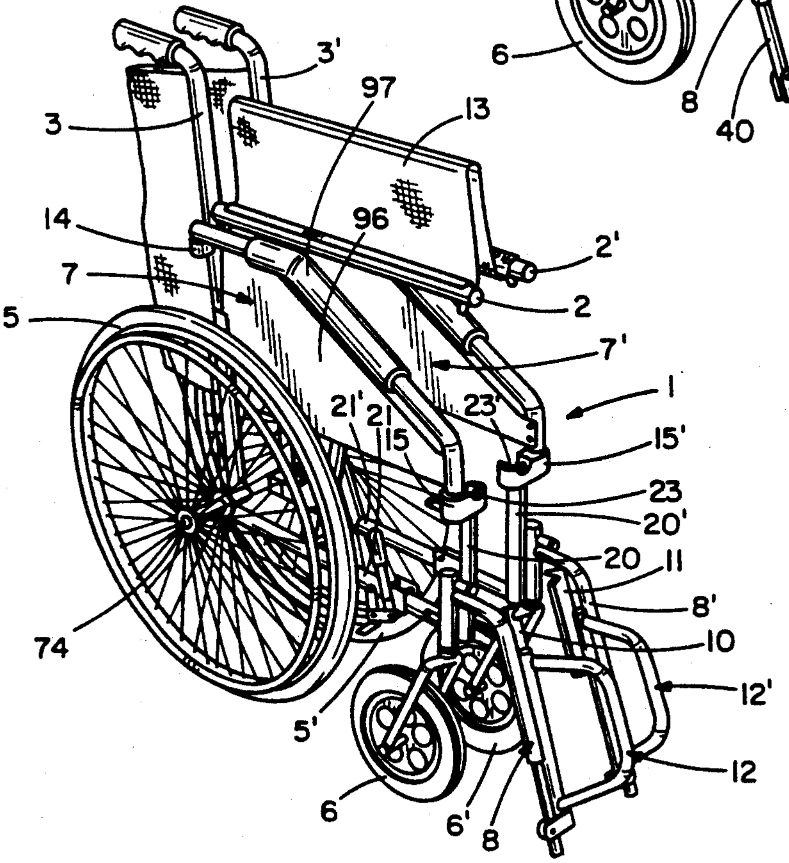
FIG. 2 is a perspective view of the wheelchair of FIG. 1 in a folded, fully-assembled condition.
Figure 18:
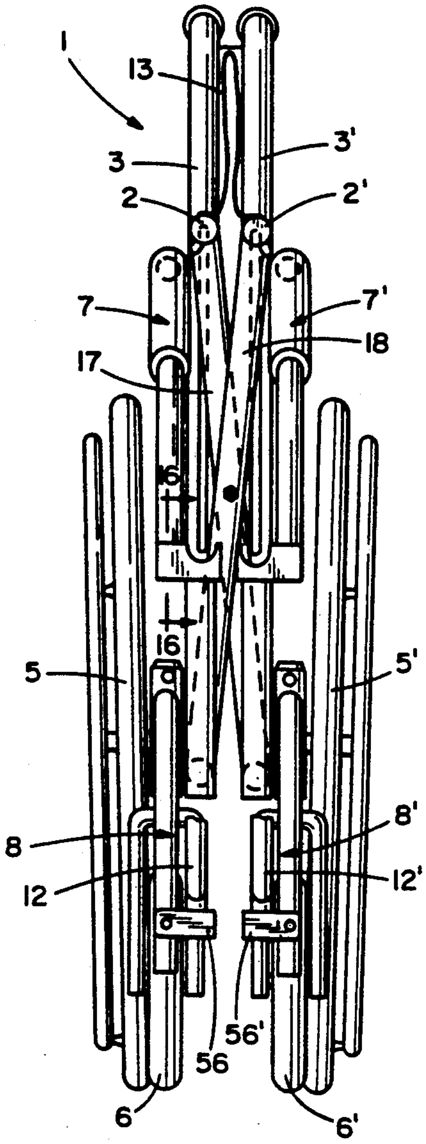
FIG. 18 is a front view of the wheelchair in a folded condition.

A preferred embodiment of wheelchair 1 of this invention in an unfolded condition ready for occupancy is shown in FIGS. 1, 4, 5, and 6, and in a folded fully-assembled condition in FIGS. 2 and 18. The novel design features of wheelchair 1 render it both light-weight and easily transportable. A durable prototype of the wheelchair weighs about 22 lbs., a substantial eight reduction over most prior art wheelchairs.

Figure 3:
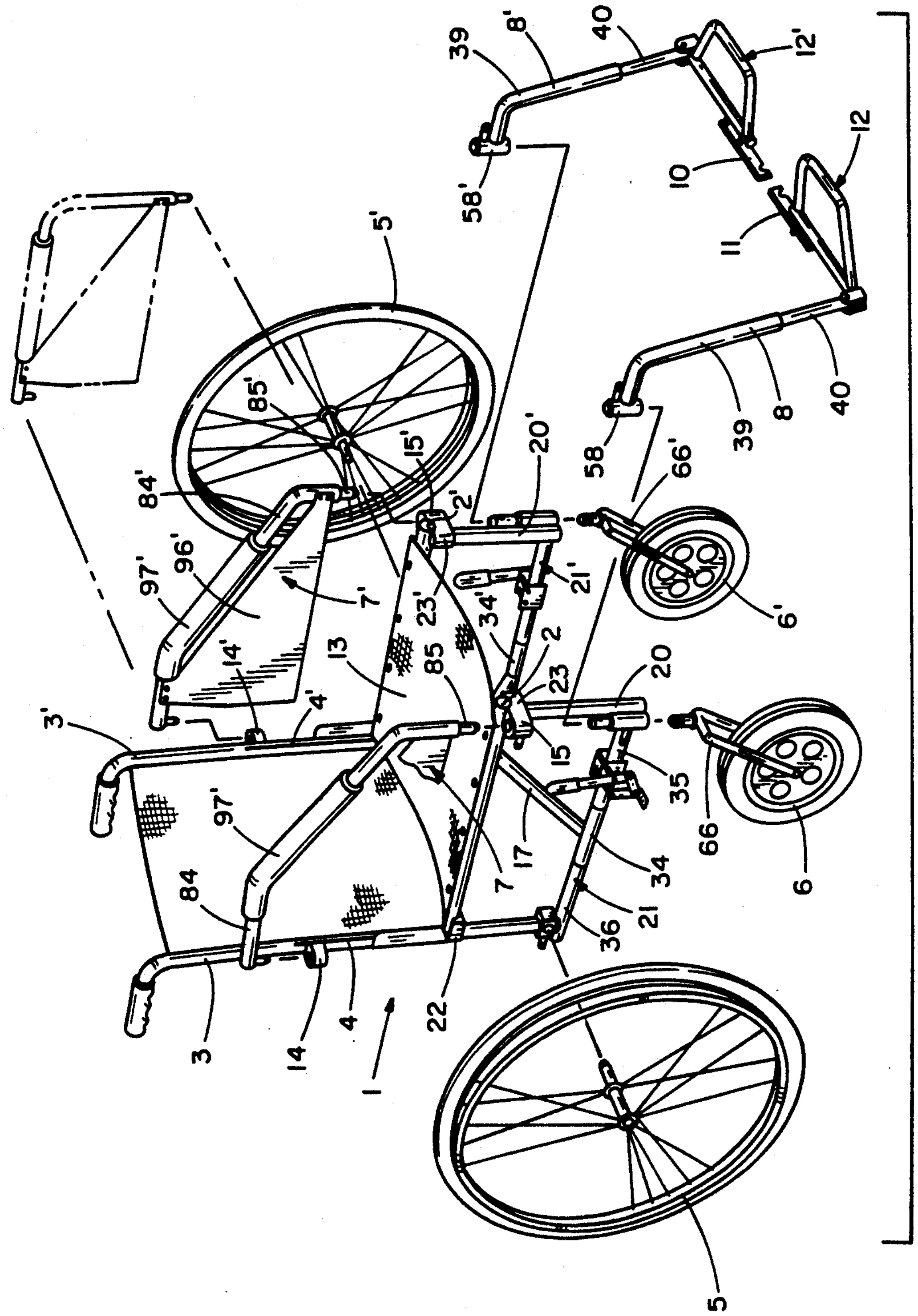
FIG. 3 is an exploded view of the wheelchair which shows the various subassemblies and parts detached from the frame to facilitate transport of storage, for example.

The relative small storage profile of the wheelchair is due principally to a novel feature by which seat-support frame members 2 and 2′ are directly and adjustably coupled to back-frame members 3 and 3′ so as to reciprocate up-and-down within guide slots 4 and 4′ of back-frame members 3, 3′ (FIGS. 4, 5, 7, 8 and 14 . Additionally all four wheels 5, 5′, 6 and 6′, both armrests 7 and 7′, and both footrests 8 and 8′ (FIG. 3) are detachable s that the wheelchair frame may be reduced to its basic small-profile frame structure FIG. 28). This arrangement reduces the overall folded height, width and depth of wheelchair 1.

Figure 24:
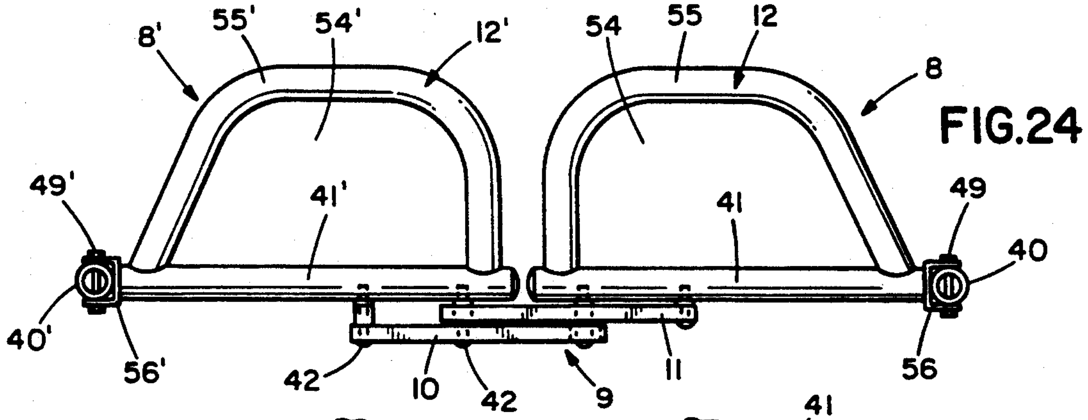
FIG. 24 is a plan view which shows the two footrest platforms in locking engagement.
Figure 27:
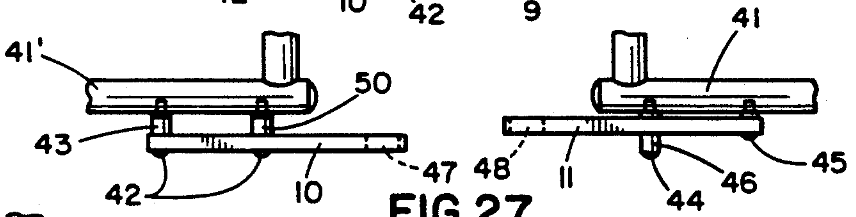
FIG. 27 is a plan view which shows the footrest platform interlock disengaged.
Figure 25:
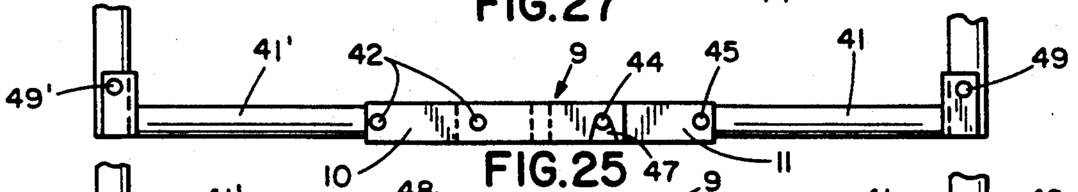
FIG. 25 is a front view of the footrests in locking engagement.
Figure 26:
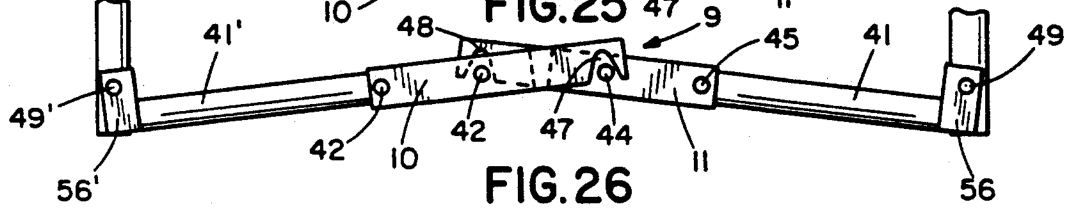
FIG. 26 is a front view of the footrest platform interlock partially disengaged.

Another principal feature relates to footrest interlock 9 (FIGS. 24, 25, 26 and 27) which employs a pair of interlock bars 10 and 11 supported on footrest platforms 12 and 12′. When wheelchair 1 is in an unfolded condition interlock 9 rigidly couples footrest platforms 12 and 12′ together (FIGS. 1, 24 and 25) to give wheelchair 1 exceptional strength and rigidity in spite of its lightweight.

Another feature relates to an adjustment structure (FIG. 31) which enables footrests 8 and 8′ to be manually lengthened or shortened to locate platforms 12 and 12′ at the optimum distance from seat 13 for the comfort of the wheelchair occupant.

Another feature relates to an alignment and support structure (FIG. 17) which facilitates the placement and removal of armrests 7 and 7′ relative their rear armrest supports 14 and 14′ (FIG. 13 and their front armrest supports 15 and 15′ (FIG. 30).

Figure 19:
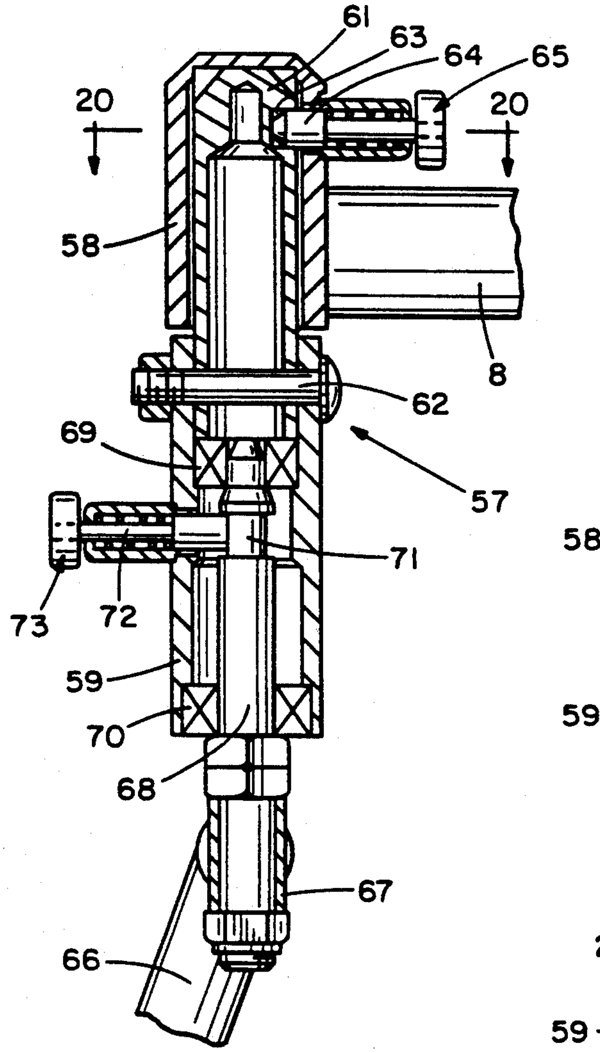
FIG. 19 is a section view taken along line 19—19 of FIG. 5 which shows the subassembly for coupling a caster and a footrest to the front frame member of the wheelchair.
Figure 20:
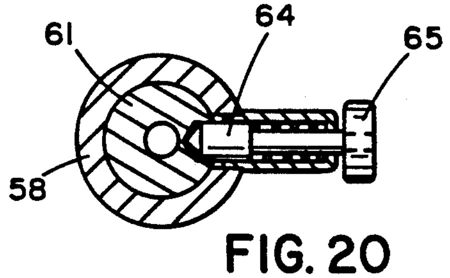
FIG. 20 is a section view taken along line 20—20 of FIG. 19 which shows the engagement of the footrest lock to the footrest support pin.

Another feature relates to the structure (FIG. 19) for pivotally coupling and locking footrests 8 and 8′ and front caster wheels 6 and 6′ (FIGS. 19, 20, 21 and 22) to wheelchair 1.

Another feature relates to the hub and axle structure (FIG. 23) for coupling and locking rear wheels 5 and 5′ to the wheelchair. This feature also facilitates the removal of these wheels from the wheelchair.

DETAILED DESCRIPTION OF THE PREFERRED EMBODIMENT

Figure 5:
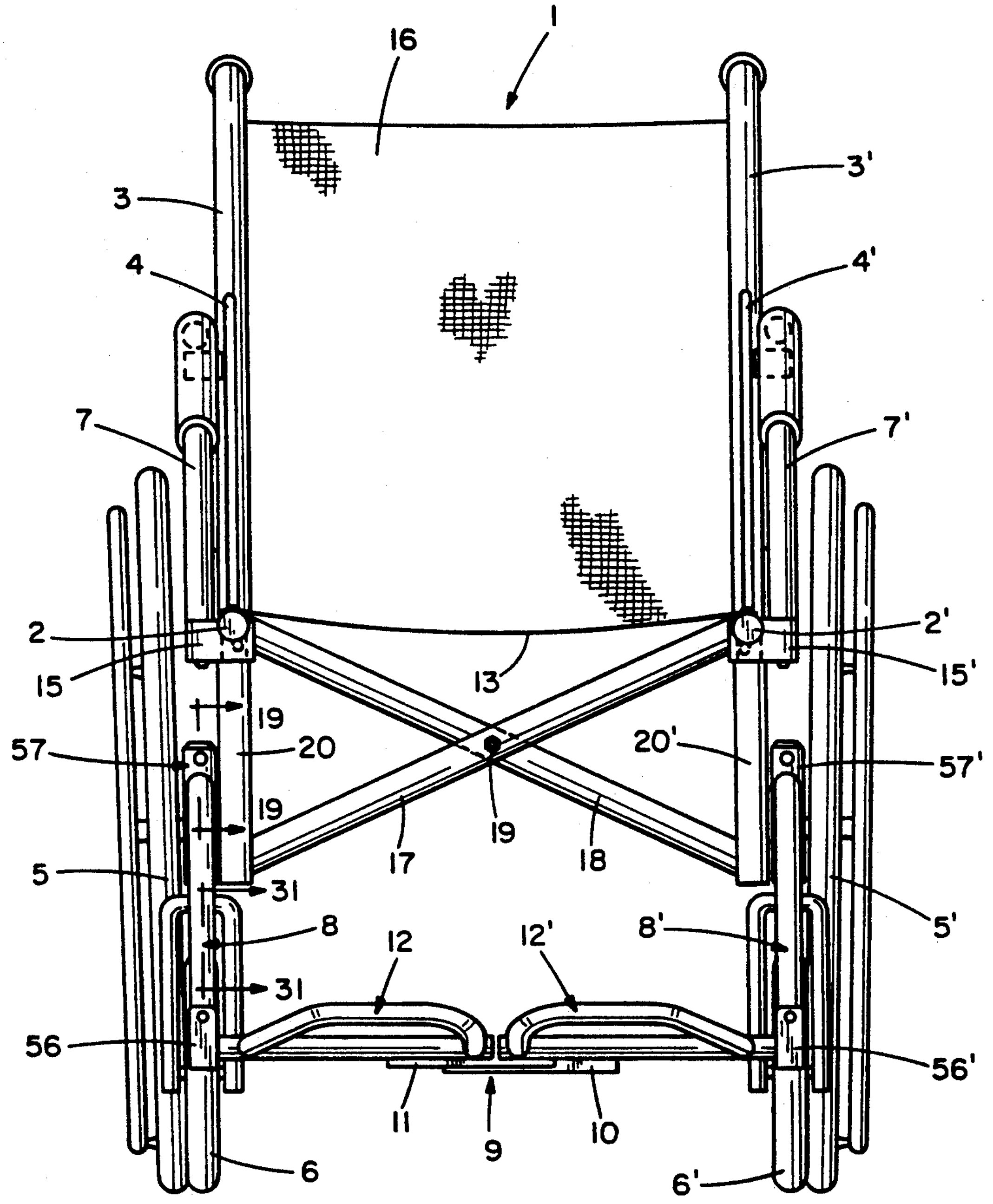
FIG. 5 is a front elevation view of the wheelchair.
Figure 6:
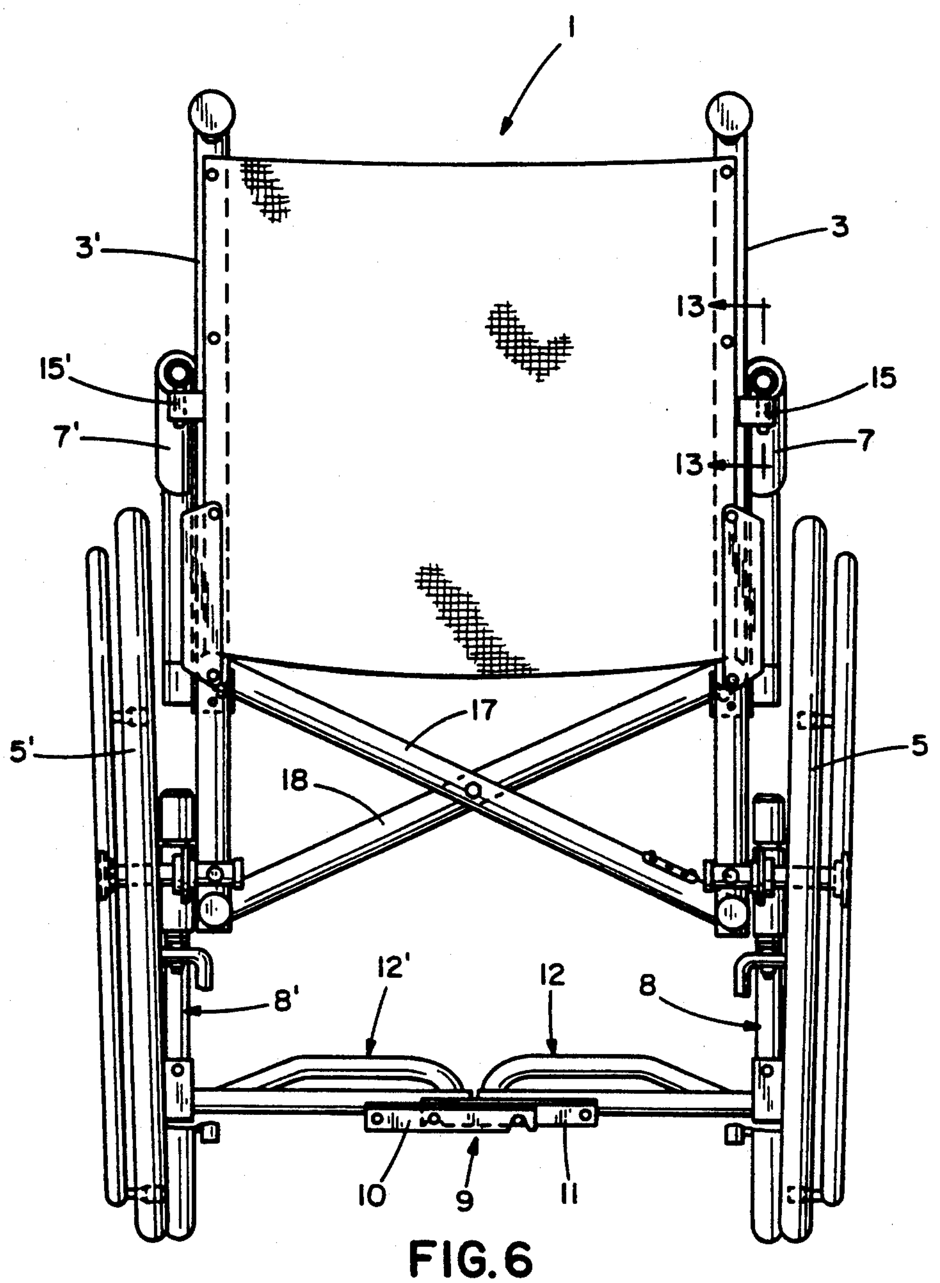
FIG. 6 is a rear elevation view of the wheelchair.
Figure 28:
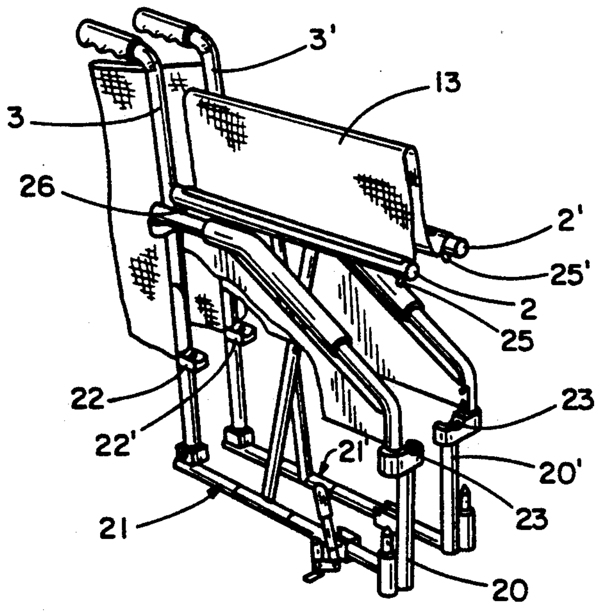
FIG. 28 shows the wheelchair frame in a folded condition with all wheels and footrests removed.

The basic lightweight frame assembly of wheelchair 1 is shown in FIG. 28 with all manually detachable parts removed, except armrests, and with flexible cloth or plastic seat 13 and back 16 folded in response to the folded disposition of the frame assembly. The frame assembly comprises a right frame subassembly and a left frame subassembly adjustably coupled together by an x-crossbrace formed by a front crossarm 17 and rear crossarm 18 coupled together at their longitudinal centers by a pivot bolt 19 (FIG. 5).

The right frame subassembly comprises fixed back-frame member 3, fixed front-frame member 20, fixed crossbrace-support frame member 21 joining members 3 and 20, and movable seat-support frame member 2. The left frame subassembly has corresponding frame members referenced with identical numbers bearing a prime (′) mark.

It should be noted that each frame subassembly has only a single fixed frame member (crossbrace - support frame member 21, 21′) joining the front-frame member 20, 20′ to the back-frame member 3, 3′. In the typical wheelchair of the prior art two, and in some cases more, fixed frame members join a front-frame member to a back-frame member, thus adding considerably to the weight of the wheelchair.

Figure 29:
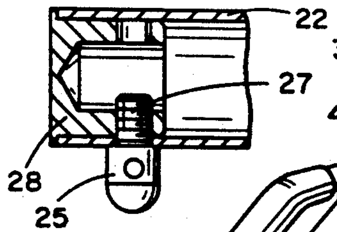
FIG. 29 is a section View taken along line 29—29 of FIG. 14 which shows the locking pin for the right seat-support frame member.
Figure 14:
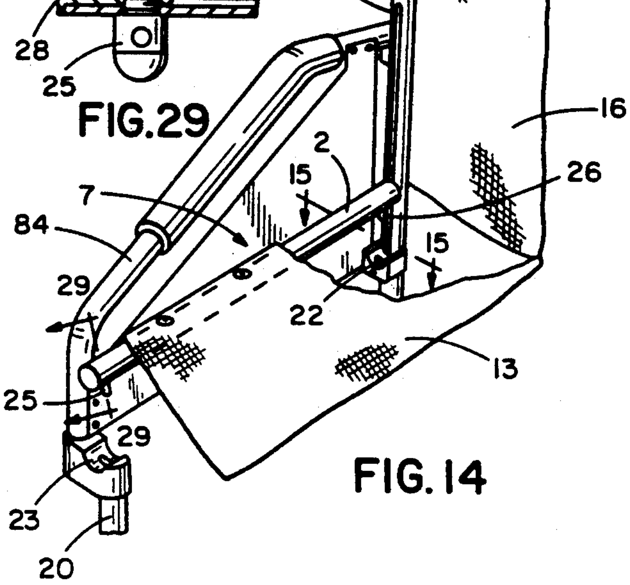
FIG. 14 is a fragmentary view which shows the right seat-support frame member separated from its front and rear saddles.
Figure 15:
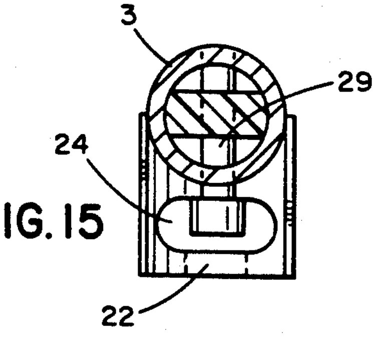
FIG. 15 is a section view taken along line 15—15 of FIG. 14 which shows a top view of the rear seat-support saddle and its attachment to the right back-frame member.

Wheelchair 1 is nonetheless both strong and rigid in its folded condition because of a unique saddle-seating arangement comprising a set of rear saddles 22, 22′ and a set of front saddles 23, 23′ (FIGS. 3, 4, 7, 8, 14, 15, 28 and 30). The upper surface portion of each saddle body is formed with a partially-circular recess contoured to receive and nest seat-support frame member 2, 2′ when wheelchair 1 is in the unfolded condition. The body of each saddle is also formed with a locking-pin socket hole 24 (FIG. 15) which has a greater hole width from side-to-side than from back-to-back. Each seat-support frame member 2, 2′ carries a pair of locking pins (FIGS. 7, 8, 14 and 29 which tightly mate with the socket holes 24 of each saddle 22, 22′, 23, 23′. The locking pins of each pair are located on each seat-support frame member 2, 2′ at the front and rear of its associated seat support member. In particular seat-support frame member 2 carries a front locking pin 25 and a rear locking pin 26 (FIGS. 14, 28 and 30) and seat-support frame member 2′ carries a front locking pin 25′ and a rear locking pin 26′. Each locking pin has a threaded shank 27 which engages a mating hole formed in plastic locking-pin retainer plug 28 (FIG. 29). As each locking pin is seated in its associated saddle, the pin moves sideways in the elongated direction of socket hole 24. Each rear saddle 22, 22′ is fastened to its associated back-frame member by a machine screw 29 (FIG. 15) whose head is located within socket hole 24. Each front saddle 23, 23′ is seated on and fixed to the upper end of its associated front frame member 20, 20′ (FIG. 30).

In order to facilitate the up-and-down movement of each seat-supported frame member 2, 2′ relative to its associated slot 4, 4', each back frame member 3, 3' houses an elongated metal liner 30 (FIGS. 8, 9, and 10). Liner 30 and the inside wall of back-frame member 3, 3' define a cavity 31 which houses head 32 of plastic rear-guide plug 33. Each rear-guide plug 33 is fixed to its associated seat-support frame member 2, 2' by rear locking pin 26, 26'.

Figure 11:
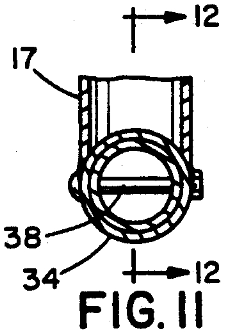
FIG. 11 is a fragmentary section view taken along line 11—11 of FIG. 4 which shows the attachment of the front crossarm to the right pivot tube.
Figure 12:
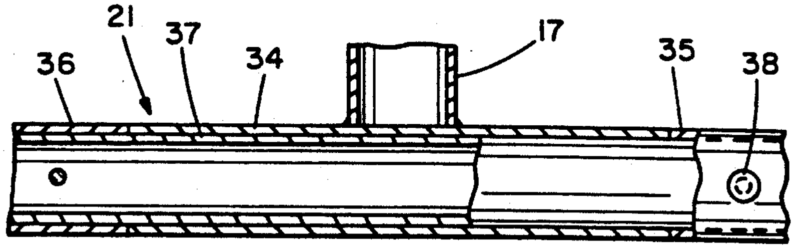
FIG. 12 is a section view taken along line 12—12 of FIG. 11 which shows a detail of the crossbrace-support frame member.

Crossarms 17 and 18 are fixed to pivot tubes 34 and 34' respectively (FIGS. 11 and 12). As wheelchair 1 is folded and unfolded, each crossarm rotates its associated pivot tube. Each pivot-tube is sandwiched between a pair of associated pivot-tube positioning frame members 35, 36, and 35' 36' which are fixed to the front and back frame members. A support tube 37 (FIG. 12) is housed within the composite bore defined by each pivot tube 34, 34' and its associated pivot-tube positioning frame members. Each support tube is fixed by a set of bolts 38 to its enveloping pivot-tube positioning frame members to form a rigid support structure for the rotatable pivot tubes. The ends (not shown) of each support tube are not welded to the adjacent portions of front-frame members 2,2' and back-frame members 3, 3'.

The strength and rigidity of wheelchair 1 provided by the guide pin and saddle coupling of the seat-support frame members 2, 2' to the right and left frame subassemblies during the unfolded condition of the wheelchair is subtantially increased by footrest interlock 9 (FIGS. 5, 6, 24, 25, 26 and 27). When interlockbars 10 and 11 are engaged in the lock position shown in FIGS. 1, 5, 24 and 25, platforms 12, 12' are locked together to form a rigid structure imparting reinforcing strength to front-frame members 20, 20' through footrest support arms 39, 39' and their platform extension tubes 40, 40' (FIGS. 1, 5 and 31).

Back interlock bar 10 is fixed to and spaced from heel tube 41' of platform 12' by a pair of machine screws 42 inserted through spacer bushings 43 and 50. Front interlock bar 11 is fixed to, but not spaced from, heel tube 41 by a pair of machine screws 44 and 45. A cylindrical bushing 46 is fixed to bar 11 by screw 44. Bar 10 is formed with a lock notch 47, and bar 11 is formed with a lock notch 48. Interlock of platforms 12 and 12' is effected by pivoting the platforms on pivot bolts 49 and 49' so that notch 48 engages bushing 50 and notch 47 engages bushing 46. When footrests 12 and 12' are locked together, the platforms 12, 12' and bars 10 and 11 form a rigid beam which reinforces both side frame subassemblies through the footrest support arms 39, 39' and their telescoping extension tubes 40, 40'.

Figures 4, 31:
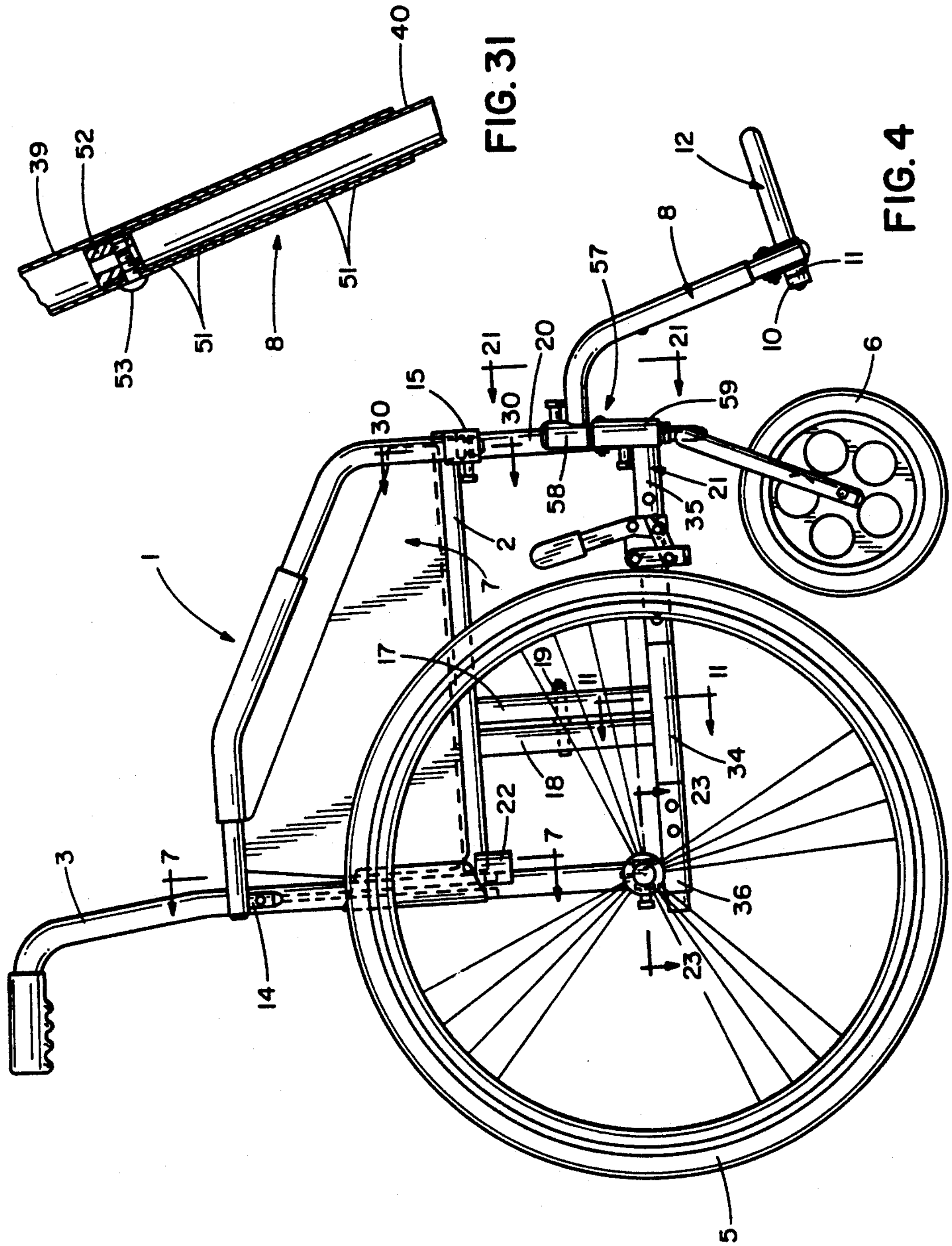
FIG. 4 is a side elevation view of the wheelchair.
FIG. 31 is a fragmentary section view taken along line 31—31 of FIG. 5 which shows a length adjustment feature for the footrests.

The extent of telescoping of each footrest support arm 39, 39' and its associated extension tube 40, 40' may be varied to suit the comfort of a particular occupant of wheelchair 31 by the adjustment structure of FIG. 31. Each footrest support arm 39, 39' is formed with a series of screw-receiving holes 51 spaced along the length of each footrest support arm. A footrest adjusting-screw retainer 52 is fixed to the upper end of each platform extension tube 40, 40'. Adjusting screw 53 is inserted in the appropriate hole 51 to engage retainer 52 to fix the desired length of the footrest.

The weight of each footrest is reduced by forming each platform 12, 12' with a large opening 54, 54' (FIG. 24) defined by joining heel tubes 41, 41' and U-shaped toe tubes 55, 55'. Pivot brackets 56, 56' are fixed to heel tubes 41, 41', and these brackets pivot 90° on pivot bolts 49, 49'. The platforms are pivoted to their upright position (FIG. 18) when wheelchair 1 is folded.

Figure 21:
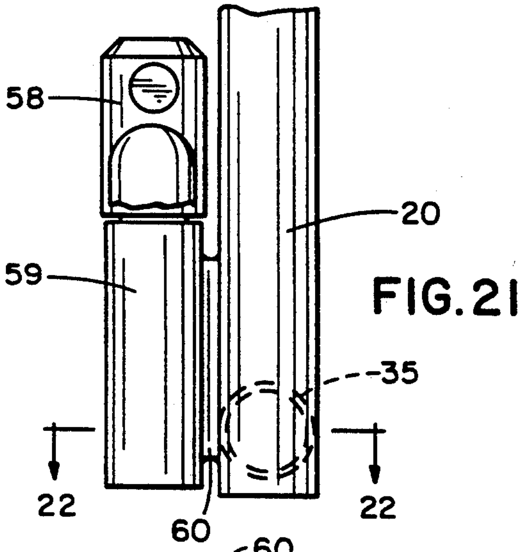
FIG. 21 is a fragmentary view which shows the caster and footrest support housing attached to the front frame member.
Figure 22:
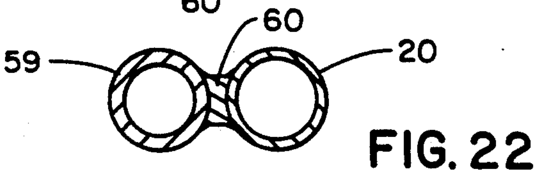
FIG. 22 is a section view taken along line 22—22 of FIG. 21 which shows the attachment of the caster and footrest housing to the front frame member.

Footrests 8, 8' and caster wheels 6, 6' are supported on their associated frame members (FIGS. 19, 20 and 21) by foot-rest-and-caster subassemblies 57, 57'. Each subassembly 57, 57' includes a rotatable footrest-support cap 58, and a fixed cylindrical caster housing 59, 59' joined to front-frame members 20, 20' and pivot-tube positioning frame members 35, 35' by elongated welds 60, 60' (FIGS. 21 and 22). A hollow footrest support pin 61, 61' is partially inserted within the bore of its associated caster housing 59, 59' and fixed to this housing by bolt 62. Footrest support caps 58, 58' are detachably seated upon their associated support pins 61, 61'. The upper portion of each support pin 61, 61' is formed with a small footrest-alignment locking hole 63 which is sized to receive tightly spring-loaded locking pin 64 of button lock 65. Hole 63 is positioned on support pin 61 so that the insertion of pin 64 within the hole aligns footrests 8, 8' in the position shown in FIG. 1. Removal of footrests 8, 8' is effected simply by removing pin 64 from hole 63 and lifting caps 58, 58' from their associated support pins 61, 61'.

Forks 66,66' of caster wheels 6, 6' are fixed to their associated fork coupling tubes 67, 67'; and caster stems 68, 68' are in turn fixed to their related coupling tube 67, 67'. Each caster stem 68, 68' is supported Within its caster housing 59, 59' by a set of bearings 69 and 70. A groove 71 is formed in the shank of each caster stem and spring-loaded locking pin 72 of button lock 73 engages this groove to retain caster stems 68, 68' within their associated housings 59, 59' while permitting caster action. Caster wheels 6, 6' are removed from wheelchair 1 by manually withdrawing locking pin 72 from groove 71 and withdrawing caster stems 68, 68' from their housings.

Figure 23:
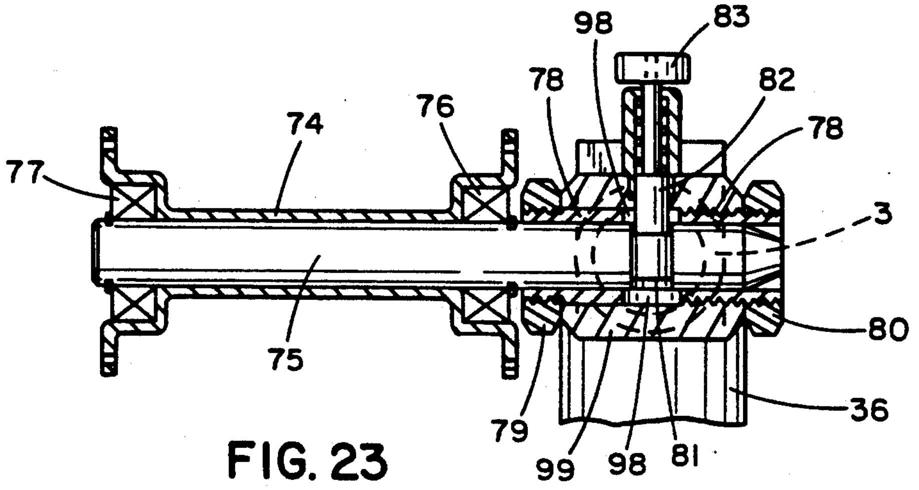
FIG. 23 is a section View which shows details of the hub for the rear wheel and its attaching structure to the back frame member.

Rear wheels 5, 5' are also removable from the wheelchair frame assembly. These wheels are mounted on a detachable hub-and-axle subassembly (FIG. 23). Hub 74 is rotatably supported on fixed axle 75 by bearings 76 and 77. Threaded rear-axle sleeve 78 passes through ring housing 99. Sleeve 78 is fixed to back-frame member 3 by nuts 79 and 80. A circular groove 81 is engaged by the spring-biased locking pin 82 of button lock 83 by passing through sleeve hole 98 to retain wheels 5, 5' on the wheelchair frame assembly. Manual retraction of locking pin 82 permits hub 74 and axle 75, with the supported wheel, to be removed easily from wheelchair 1.

Figure 16:
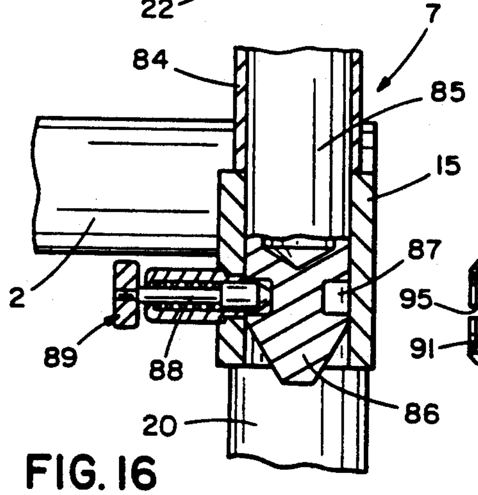
FIG. 16 is a section view taken along line 16—16 of FIG. 18 which shows the right-armrest front guide pin coupled and looked to the front seat-support saddle.

The last feature of wheelchair 1 to be described relates to armrests 7, 7' and their alignment (FIGS. 13 and 17) and support structure (FIGS. 7 and 16). Each armrest 7, 7' has a cushion and clothing guard support arm 84 which may be of different curved shapes depending upon the requirements of the wheelchair occupant. A plastic guide pin 85 is inserted into the front tube opening (FIG. 16) and fixed in this opening. Guide pins 85, 85' are each formed with a tapered nose 86 which facilitates the coupling of armrests 7, 7' to their associated front armrest supports 15, 15'. Guide pins 85, 85' are each also formed with a cylindrical locking groove 87 which receives spring-biased locking pin 88 of button lock 89 to lock the armrests to the wheelchair frame. Manual withdrawal of the locking pins from their associated locking grooves enables the front ends of armrest 7, 7' to be withdrawn from their supports 15, 15'.

Figure 17:
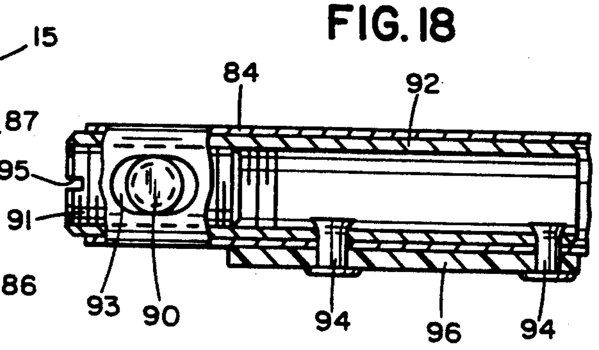
FIG. 17 is a section view taken along line 17—17 of FIG. 13 which shows the structure for aligning the armrest rear guide pin to its rear armrest support.

The rear ends of armrests 7, 7' are coupled to their related rear armrest supports 14, 14' by rear armrest guide pins 90, 90' (FIGS. 13 and 17). Accurate alignment of these guide pins relative to their armrest supports is effected by screwing male armrest adjusting screw 91 into the threaded bore of female sleeve 92 so as to align guide pins 90, 90' with the holes of rear armrest supports 14, 14'. The bottom tube wall of the rear end of cushion and clothing guard support arm 84, 84' is formed with an elongated alignment slot 93 which overlaps and is aligned with a similar elongated slot formed in the adjacent wall of female sleeve 92 (FIG. 17). The body of male adjusting screw 91 is formed with an internally threaded hole which receives the threaded shank of an associated guide pin 90, 90' when the hole is accessible through alignment slot 93 and the slot of female sleeve 92. The relative position of male adjusting screw 91 relative to slot 93 effected by screwing adjusting 91 into sleeve 92 determines the alignment of each guide pin 90, 91' with its associated armrest support 14, 14'.

A set of rivets 94 fix female sleeve 92 to the associated cushion and clothing guard support arm 84, 84'. Male screw 91 is driven by inserting a screw driver in groove 95 (FIG. 17). Each armrest may have optional clothing guards 96, 96' and armrest cushions 97, 97'.

It should be understood that the specific structural features described in this specification may be modified without departing from the scope of the invention.

What is claimed is:

1. In a foldable wheelchair the improvement comprising: a wheelchair frame having spaced left and right frame subassemblies with each subassembly having a generally vertically disposed back-frame member, a generally horizontally disposed seat-support frame member locked with and adjustably coupled to the back-frame member so as to move up and down a partial length of the back-frame member, a generally vertically disposed front-frame member with the seat-support frame member being coupled to the front-frame member when the wheelchair is in its unfolded condition and uncoupled from the front-frame member when the wheelchair is in its folded condition, load-transmitting and guide coupling means having first locking elements supported by each of the front and back frame members and second locking elements supported on the seat-support frame member and mating with the first locking elements to effect locked coupling of the seat-support frame member to the front and back frame members when the wheelchair is in the unfolded condition and with the otherwise locked coupling elements being disengaged when the wheelchair is in the folded condition, and a crossbrace-support frame member extending between and fixed to the back-frame member and the front-frame member below the seat-support frame member and with the crossbrace-support frame member being the sole, fixed and non-detachable frame member connected between the back-frame member and the front-frame member to fix rigidly the front and back-frame members one to the other in both the folded and unfolded condition of the wheelchair; and a crossbrace having a pair of centrally pivoted crossarms with each crossarm extending between a different seat-support frame member and a different crossbrace-support frame member whereby pivoting movement of the crossarms moves both seat-support frame members up and down their associated back frame members.

2. The combination of claim 1 comprising a flexible back supported on and between the two back-frame members, and a flexible seat supported on and between the two seat-support frame members each of which is an elongated member having a generally straight longitudinal axis, whereby relative movement of the two seat-support frame members up the partial length of the two back-frame members causes both the seat and the back to fold and relative movement of the two seat-support frame members down the partial lengths of the two back-frame members causes both the seat and frame to unfold, and in which each crossarm is connected to a central portion of its associated seat-support frame member with the seat-support frame member projecting freely beyond its point of attachment to the crossarm and its point of coupling to the front frame member when the wheelchair is in its folded condition.

3. The combination of claim 2 in which the second locking elements are a seat of guide and load-transmitting pins fixed to and projecting generally transversely from the longitudinal axis of each seat-support frame member and movable with the frame member, and in which the first locking elements are a set of pin-receiving saddles each formed with a recess having a narrow front-to-back slotted pin-receiving opening which is elongated in a direction extending between the left and right subassemblies fixed to both the left and right frame subassemblies and located to receive the guide and load-transmitting pins when the wheelchair is unfolded so that the back and front frame members of each frame subassembly are connected by both its associated cross-brace-support frame member and its associated seat-support frame member.

4. The combination of claim 1 in which the adjustable coupling of each seat-support frame member to its associated back-frame member comprises means fixed to and projecting from the rear of the seat-support frame member into an elongated slotted opening formed in its associated back frame member.

5. The combination of claim 4 in which each associated back-frame member is a tube and in which the means fixed to and projecting from the rear of the seat-support frame is a rear-guide plug having a head passing through the slotted opening and locked within the tube bore of its associated back frame member.

6. The combination of claim 5 in which an elongated liner is housed within the tube bore of each back-frame member adjacent the slotted opening of that member to provide a guiding surface for the locked rear-plug guide head of that member.

7. The combination of claim 1 in which each crossbrace-support frame member comprises a pivot tube fixed to a different crossarm, and a pair of fixed pivot-tube positioning frame elements sandwiching the pivot tube whereby rotational movement of the pivot tube enables both crossarms to move about their central pivot.

8. The combination of claim 7 comprising a support tube inserted within the bores of both fixed pivot-tube positioning frame elements and the sandwiched pivot tube with the support tube being fixed to both fixed pivot-tube positioning frame elements.

* * * * *